United States Patent [19]

Mori

[11] Patent Number: 4,653,472
[45] Date of Patent: Mar. 31, 1987

[54] SOLAR RAY ENERGY COLLECTING DEVICE

[76] Inventor: Kei Mori, 3-16-3-501, Kaminoge, Setagaya-ku, Tokyo, Japan

[21] Appl. No.: 767,567

[22] Filed: Aug. 20, 1985

[30] Foreign Application Priority Data

Aug. 31, 1984 [JP] Japan ................... 59-183293

[51] Int. Cl.4 .................. F24J 2/00
[52] U.S. Cl. ................. 126/440; 126/439; 136/246; 350/96.1; 350/96.24
[58] Field of Search ........... 136/246; 126/440, 439; 350/96.1, 96.24

[56] References Cited

U.S. PATENT DOCUMENTS

| | | | |
|---|---|---|---|
| 3,801,389 | 4/1974 | Fujimara | 136/246 |
| 4,106,952 | 8/1978 | Kravitz | 126/440 |
| 4,191,593 | 3/1980 | Cacheux | 136/246 |
| 4,201,197 | 5/1980 | Dismer | 126/439 |
| 4,238,246 | 12/1980 | Genequand et al. | 126/440 |
| 4,267,823 | 5/1981 | Bohg et al. | 126/440 |
| 4,284,839 | 8/1981 | Johnson | 126/440 |
| 4,307,936 | 12/1981 | Ochiai | 126/417 |
| 4,312,330 | 1/1982 | Holdridge | 126/440 |
| 4,395,582 | 7/1983 | Damsker | 126/417 |
| 4,411,490 | 10/1983 | Daniel | 126/439 |
| 4,425,907 | 1/1984 | Younghouse | 126/439 |
| 4,458,672 | 7/1984 | Wesley | 126/440 |
| 4,461,278 | 7/1984 | Mori | 126/440 |
| 4,483,311 | 11/1984 | Whitaker | 126/440 |
| 4,511,755 | 4/1985 | Mori | 126/441 |

Primary Examiner—Samuel Scott
Assistant Examiner—H. A. Odar
Attorney, Agent, or Firm—Jordan and Hamburg

[57] ABSTRACT

A solar ray energy collecting device capable of effectively separating and collecting only a light component of a desired wave length among the solar rays. The solar ray energy collecting device comprises a light focusing lens being provided with a light intercepting member on the central part thereof, an optical conductor having a light-receiving edge situated at the position of the lens' focus, a reflector installed at the circumferential portion of the optical conductor, and means for collecting energy of the light component reflected by the reflector.

17 Claims, 4 Drawing Figures

SOLAR RAY ENERGY COLLECTING DEVICE

BACKGROUND OF THE INVENTION

The present invention relates to a solar ray energy collecting device capable of effectively separating and collecting only a light component of a desired wave length among the solar rays.

The present applicant has previously proposed various ways to focus solar rays or artificial light rays by use of lenses or the like, to guide the same into an optical conductor, and thereby to transmit them onto an optional desired place through the optical conductor for use in illumination or for other like purposes.

However, in the case of employing the light energy transmitted through the optical conductor in such a manner as mentioned above as a photo-synthesis light source for nurturing chlorella or intensively cultivate the plants, a light source for breeding fish, a light source for promoting human health, and a light source utilized for various other purposes, there are many cases in which only a desired light component fitted in the purpose of utilization needs to be selectively separated and employed among the light components contained in the light energies.

However, although various techniques of cutting off infrared rays, ultraviolet rays, or the like have already been proposed up to now, a technique of taking out a light component of the specially designated wave length among the white light rays has not yet been proposed at all. Furthermore, it was very difficult to obtain the infrared rays, the ultraviolet rays, or the like which contain no visible light rays' component or very small amount of component of those visible rays.

The present applicant has previously proposed in the other ways a light focusing lens capable of effectively separating and taking out only a light component of a desired wave length among the solar rays in consideration of the actual situation as mentioned above.

SUMMARY OF THE INVENTION

The primary object of the present invention is to provide a solar ray energy collecting device capable of effectively separating and collecting only a light component of a desired wave length among the solar rays.

It is another object of the present invention to provide a solar ray energy collecting device in which a specially designated wave length component among the solar rays energies can be utilized as the light energy and the other wave length components can be utilized as the thermal energy or the electric energy.

It is another object of the present invention to provide a solar ray energy collecting device in which a desired wave length component can be separated from the solar rays' components and taken out, and thereby it can be most effectively utilized in accordance with the wave length component.

The above-mentioned features and other advantages of the present invention will be apparent from the following detailed description which goes with the accompanying drawings.

DESCRIPTION OF THE PREFERRED EMBODIMENTS

Figure 1:
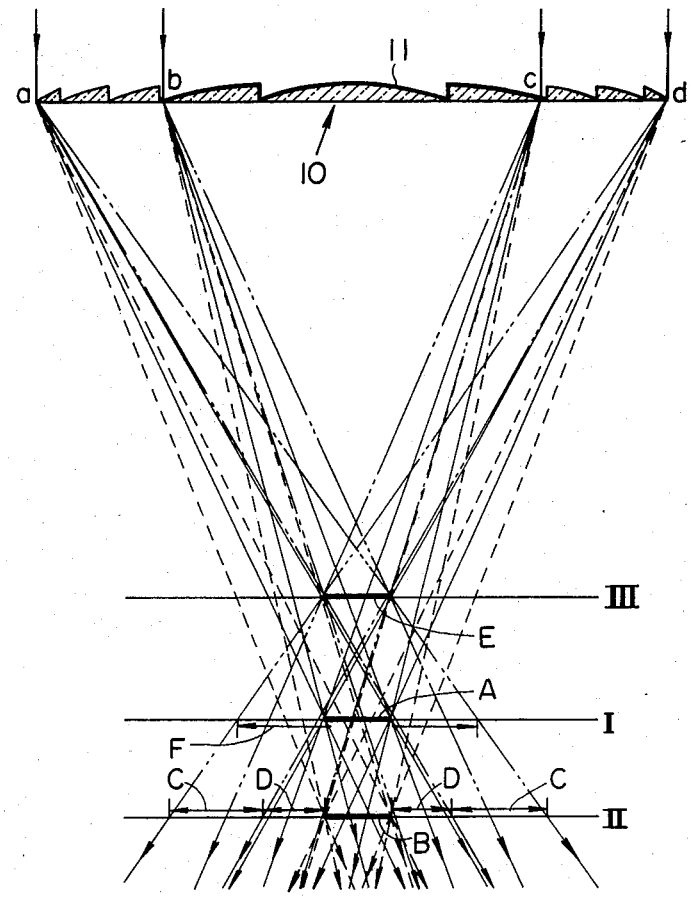
FIGS. 1 and 2 are views showing the light focusing lenses employed in the present invention, respectively.

FIG. 1 is a construction view for explaining a light focusing lens which has been previously proposed by the present applicant. In FIG. 1, 10 is a Fresnel lens, and 11 is a light intercepting membrane mounted on the central portion of the Fresnel lens 11. The solar rays or the artificial light rays arrive directly at the points; a, b, c and d, of the lens 10 are focused, respectively, as shown in FIG. 1.

Moreover, in FIG. 1, the green light rays are shown by solid lines, the red light rays by dotted lines, and the blue light rays by two-dots-and-dash lines, respectively. Therefore, at the portion A of the plane I in FIG. 1 comparatively pure green light rays are concentrated, at the portion B of the plane II comparatively pure red light rays, and at the portion E of the plane III comparatively pure blue light rays. Consequently, if each light-receiving edge of the optical conductors is put at those portions; A, B and E, respectively, the light rays having only the desired light component can be guided into the optical conductor.

Moreover, on the plane II, the portion C is a blue light component area, and the portion D is a green light component area. It has been described, heretofore, that the light-receiving edge of the optical conductor is moved to the direction of the lens' optical axis so as to take out the light component of a desired wave length. However, the light component guided into the optical conductor can be also changed in accordance with the diameter of the optical conductor. For instance, if the diameter of the optical conductor is equal to F on the plane I, the visible light rays containing the light components from red to blue are guided into the optical conductor.

Figure 2:
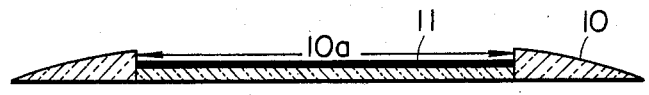

FIG. 2 is a cross-sectional view showing another embodiment of the afore-mentioned light focusing lens. In FIG. 2, a light focusing lens 10 has a central portion 10a formed in a state of plane surface, and a light intercepting member 11 is mounted on the plane portion thereof. In relation to such a light focusing lens, the plane portion 10a can be formed at the same time when the lens is formed, and thereby the dimension and location of the light intercepting member can be determined precisely. And further, since the surface for mounting the light intercepting member thereon is plane, it will be very easy to form a light intercepting membrane 11.

Moreover, in the case of employing a reflector as the light intercepting member, the lens is not heated at all. Consequently, there is less fear that the lens is not deformed due to the heat. It is very preferable. In case that there is no fear of being heated, the light intercepting member is not limited to the reflector. A light absorbing material, a photoelectric converter, or the like can be used instead of the reflector. However, when the photoelectric converter is used, the solar ray energy can be utilized much more effectively.

Figure 3:
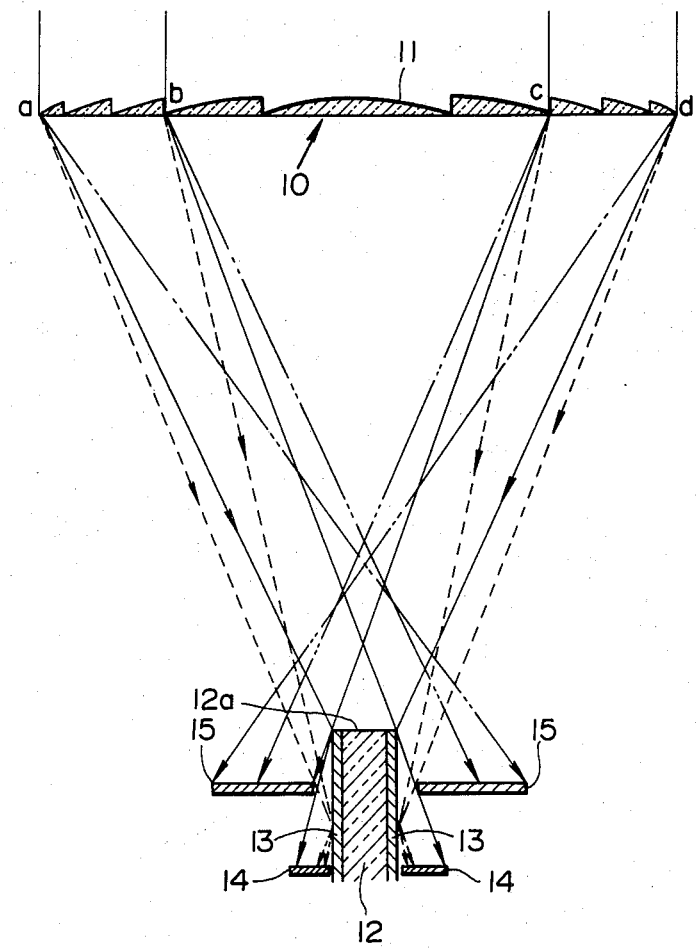
FIG. 3 is a construction view for explaining an embodiment of the solar ray energy collecting device according to the present invention.

FIG. 3 is a construction view for explaining an embodiment of the solar ray energy collecting device according to the present invention. In FIG. 3, 10 is a light focusing lens as mentioned above, 11 a light intercepting member, 12 an optical conductor, 13 a reflection member put on the outside surface at the light-receiving side of the optical conductor 12, 14 a photoelectric converter for converting the light energy reflected by the reflection member 13 to the electric energy, and 15 a photothermal converter for converting the light energy to the thermal energy.

In FIG. 3, on that occasion, the solid line shows visible light rays, the dotted line infrared rays, and the two-dots-and-dash line ultraviolet rays, respectively. The light-receiving edge 12a of the optical conductor 12 is placed, for instance, on the focus position of the visible light rays' component. Consequently, only the visible light rays' component among the solar rays' components is guided into the optical conductor 12 and transmitted through the optical conductor to an optional desired plate for use in illumination or the other like purposes.

On the other hand, the infrared rays' component among the solar rays' components arrives at the reflection member 13, and the light rays of the infrared rays' component are reflected thereon and supplied to the photoelectric converter 14, and therefore the photoelectric converter 14 can obtain an electric energy by effectively utilizing the infrared rays' component of the solar rays. And, the photothermal converter 15 is put on a place that receives the ultraviolet rays. In such a manner, even the ultraviolet rays' component of the solar rays can be effectively utilized. Moreover, as the photothermal converter 15, an inductive substance which accumulates energy by the action of the optical reaction due to the light energy can be used for example.

Figure 4:
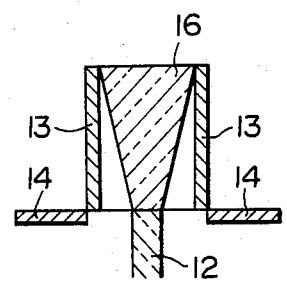
FIG. 4 is a cross-sectional view for explaining another embodiment in which the focused solar rays are guided into the optical conductor.

FIG. 4 is a cross-sectional view showing another embodiment of the light-receiving edge portion of the optical conductor 12. In FIG. 4, 16 is a conical optical conductor having a wide area of the light-receiving edge. In such a manner, it will be possible to make the diameter of the optical conductor 12 small and thereby to reduce the cost for producing the optical conductor to a large extent. However, on that occasion, a cylindrical hollow body is employed as a reflection member 13. Moreover, a light intercepting member 11 is used, as mentioned above, on the central portion of the light focusing lens 10. In the case of employing the photoelectric converter as the light intercepting member, the solar energy can be utilized much more effectively. On that occasion, if the lens having a plane surface on the central portion thereof is employed, the photoelectric converter can be easily installed.

As is apparent from the foregoing description, according to the present invention, a desired wave length component can be separated from the solar rays' components and taken out, and thereby it can be most effectively utilized in accordance with the wave length component. In consequence, the all-over utilization efficiency of the solar energy can be considerably improved.

I claim:

1. A solar ray energy collecting device comprising light focusing lens having a central portion and a peripheral portion, a light intercepting member disposed on said central portion such that said light rays are intercepted at said central portion of said lens by said light intercepting member, said peripheral portion of said lens focusing said light rays, an optical conductor having a light receiving edge spaced from said lens and disposed at a position which corresponds to the focus of one of the components of the focused light rays such that said optical conductor receives substantially only said one component of said focused light rays, said optical conductor having a longitudinal end portion adjacent to said light receiving edge, a reflector means disposed about the circumference of said end portion, said reflector means being positioned to receive and reflect substantially only another component of the light rays focused by said peripheral portion, and energy collecting means disposed to receive said reflected other component of said light rays, whereby said one and said other component of said light rays are thereby separated and collected.

2. A solar ray energy collecting device according to claim 1, wherein said light intercepting member is a light reflecting material.

3. A solar ray energy collecting device according to claim 1, wherein said light intercepting member is a light absorbing material.

4. A solar ray energy collecting device according to claim 1, wherein said light intercepting member is a photoelectric converter.

5. A solar ray energy collecting device according to claim 1, wherein said one component of said light rays is visible light rays.

6. A solar ray energy collecting device according to claim 1, wherein said other component of said focused light rays are infrared rays.

7. A solar ray energy collecting device according to claim 1, wherein said one component of said light rays is a green light component.

8. A solar ray energy collecting device according to claim 1 further comprising second energy collecting means disposed at a position which corresponds to the focus of a third component of the focused light rays such that said second energy collecting means receives substantially only said third component of said focused light rays.

9. A solar ray energy collecting device according to claim 1, wherein said energy collecting means is a photoelectric converter.

10. A solar ray energy collecting device according to claim 9, wherein said third component is ultraviolet rays.

11. A solar ray energy collecting device according to claim 9, wherein said second energy collecting means is a photothermal converter.

12. A solar ray energy collecting device according to claim 9, wherein said second energy collecting means is an inductive substance which accumulates energy by the action of an optical reaction due to optical energy.

13. A solar ray energy collecting device according to claim 1, wherein said longitudinal end portion of said optical conductor has a tapered section defined by a first end with a first diameter and a second end with a second diameter, said first diameter being greater than said second diameter, said first end being coincident with said light receiving edge.

14. A solar ray energy collecting device according to claim 13, wherein said optical conductor has a portion which extends from said longitudinal end portion, said portion having a diameter which corresponds to said second diameter.

15. A solar ray energy collecting device according to claim 13, wherein said reflector means is in the form of a cylinder which is coaxially disposed about said tapered section of said optical conductor.

16. A solar ray energy collecting device comprising light focusing lens having a central portion and a peripheral portion, a light intercepting member disposed on said central portion such that said light rays are intercepted at said central portion of said lens by said light intercepting member, said peripheral portion of said lens focusing said light rays, an optical conductor means having a light receiving edge spaced from said lens and disposed at a position which corresponds to the focus of one of the components of the focused light rays such that said optical conductor receives substantially only visible light rays of said focused light rays, said optical conductor having a longitudinal end portion adjacent to said light receiving edge, a reflector means disposed about the circumference of said end portion, said reflector means being positioned to receive and reflect substantially only infrared light rays of the light rays focused by said peripheral portion, and energy collecting means disposed to receive said reflected infrared light rays, whereby said visible light rays and said infrared light rays are thereby separated and collected.

17. A solar ray energy collecting device comprising light focusing lens having a central portion and a peripheral portion, a light intercepting member disposed on said central portion such that said light rays are intercepted at said central portion of said lens by said light intercepting member, said peripheral portion of said lens focusing said light rays, an optical conductor means having a light receiving edge spaced from said lens and disposed at a position which corresponds to the focus of one of the components of the focused light rays such that said optical conductor receives substantially only said one component of said focused light rays, energy collecting means disposed at a position which corresponds to the focus of another component of the focused light rays such that said energy collecting means receives substantially only said other component of said focused light rays, whereby said one and said other component of said light rays are thereby separated and collected.

* * * * *